US011749309B2

(12) United States Patent
Nakao et al.

(10) Patent No.: US 11,749,309 B2
(45) Date of Patent: Sep. 5, 2023

(54) INFORMATION PROCESSOR, INFORMATION PROCESSING METHOD, AND PROGRAM

(71) Applicant: SONY CORPORATION, Tokyo (JP)

(72) Inventors: Yuta Nakao, Kanagawa (JP); Nobuho Ikeda, Kanagawa (JP); Hiroshi Ikeda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/981,106

(22) PCT Filed: Jan. 10, 2019

(86) PCT No.: PCT/JP2019/000594
§ 371 (c)(1),
(2) Date: Sep. 15, 2020

(87) PCT Pub. No.: WO2019/187493
PCT Pub. Date: Oct. 3, 2019

(65) Prior Publication Data
US 2021/0110849 A1 Apr. 15, 2021

(30) Foreign Application Priority Data
Mar. 26, 2018 (JP) ................... 2018-057833

(51) Int. Cl.
*G11B 27/031* (2006.01)
*G06N 20/00* (2019.01)
(Continued)

(52) U.S. Cl.
CPC ........... *G11B 27/031* (2013.01); *G06N 20/00* (2019.01); *G06V 20/41* (2022.01); *G06V 20/46* (2022.01); *G11B 27/34* (2013.01); *H04N 5/2628* (2013.01)

(58) Field of Classification Search
CPC ...... G11B 27/031; G11B 27/34; G06N 20/00; G06K 9/00718; G06K 9/00744
See application file for complete search history.

(56) References Cited

U.S. PATENT DOCUMENTS 8,250,171 B2 * 8/2012 Terao ................. G06Q 10/10
709/217
2010/0194892 A1 8/2010 Hikita et al.
(Continued)

FOREIGN PATENT DOCUMENTS

JP 2010183302 A 8/2010
JP 2013183233 A 9/2013
(Continued)

OTHER PUBLICATIONS

International Search Report dated Mar. 19, 2019 in PCT/JP2019/000594, 1 page.

*Primary Examiner* — Mishawn N. Hunter
(74) *Attorney, Agent, or Firm* — Oblon, McClelland, Maier & Neustadt, L.L.P.

(57) ABSTRACT

To provide an information processor, an information processing method, and a program that make it possible to improve convenience in reproduction of a captured image. There is provided an information processor including a reproduction processing section that reproduces a captured image associated with tag information regarding a subject and identification information indicating relation of a plurality of pieces of the tag information on a basis of a set reproduction condition.

17 Claims, 8 Drawing Sheets

(51) Int. Cl.
*G11B 27/34* (2006.01)
*H04N 5/262* (2006.01)
*G06V 20/40* (2022.01)

(56) References Cited

U.S. PATENT DOCUMENTS

| | | | |
|---|---|---|---|
| 2011/0016150 A1* | 1/2011 | Engstrom | G06F 16/58 707/778 |
| 2013/0086112 A1* | 4/2013 | Everingham | G06F 16/972 707/780 |
| 2013/0326338 A1* | 12/2013 | Secord | G06F 16/5866 715/243 |
| 2014/0245367 A1 | 8/2014 | Sasaki et al. | |
| 2014/0349750 A1 | 11/2014 | Thompson et al. | |
| 2014/0368693 A1 | 12/2014 | Azami | |
| 2017/0235445 A1* | 8/2017 | Kim | G06F 3/04886 715/731 |

FOREIGN PATENT DOCUMENTS

| | | |
|---|---|---|
| WO | WO 2014/024475 A1 | 2/2014 |
| WO | WO 2017/051063 A1 | 3/2017 |

\* cited by examiner

FIG. 6

| A TIME | B POSITION OF BALL | C POSITION OF PLAYER, RECOGNITION RESULT OF PLAYER | D RECOGNITION RESULT OF PLAY (CONTENT OF TAG INFORMATION) |
|---|---|---|---|
| T1 | (Xb1, Yb1, Zb1) | (Xp1, Yp1, Zp1), PLAYER A | PLAYER A DRIBBLE |
| T2 | (Xb2, Yb2, Zb2) | (Xp1, Yp1, Zp1), PLAYER A | |
| T3 | (Xb3, Yb3, Zb3) | (Xp1, Yp1, Zp1), PLAYER A | PLAYER A BALL KEEPING |
| T4 | (Xb4, Yb4, Zb4) | | PASS FROM PLAYER A TO PLAYER B |
| T5 | (Xb5, Yb5, Zb5) | | PASS FROM PLAYER A TO PLAYER B |
| T6 | (Xb6, Yb6, Zb6) | (Xp1, Yp1, Zp1), PLAYER B | PLAYER B DRIBBLE |
| T7 | (Xb7, Yb7, Zb7) | (Xp1, Yp1, Zp1), PLAYER B | PLAYER B DRIBBLE |
| T8 | (Xb8, Yb8, Zb8) | (Xp1, Yp1, Zp1), PLAYER B | PLAYER B SHOT |
| ... | ... | ... | ... |

INFORMATION PROCESSOR, INFORMATION PROCESSING METHOD, AND PROGRAM

TECHNICAL FIELD

The present disclosure relates to an information processor, an information processing method, and a program.

BACKGROUND ART

A technique has been developed for reproducing each moving image of a plurality of moving images at an appropriate reproduction time when reproducing the plurality of moving images divided for each play in a digest form. Examples of the above technique include a technique described in PTL 1 listed below.

CITATION LIST

Patent Literature

PTL 1: Japanese Unexamined Patent Application Publication No. 2017-157952

SUMMARY OF THE INVENTION

Problem to be Solved by the Invention

Taking sports as an example, imaging apparatuses capture images of regions where sports are played in order to relay various sports such as basketball, tennis, volleyball, soccer, and table tennis. The regions where sports are played include, for example, a region where a sport is played, such as a court, and a region where persons other than those who play the sport may exist, such as spectator seats.

In addition, when focusing on reproduction of a captured image (moving image or still image; hereinafter the same) captured by an imaging apparatus as described above, there are needs for reproducing not only the entire captured image (moving image or still image; hereinafter the same) but also a specific scene indicated by the captured image.

Here, in the technique of the above-listed PTL 1, when reproducing a plurality of moving images in a digest form, reproduction at an appropriate reproduction time is achieved. However, in the method according to the technique of the above-listed PTL 1, it is necessary that a relationship between information regarding a sport play and a reproduction time be already known. In a play (e.g., dribbling or passing in basketball) of which a reproduction time is difficult to determine in advance, it is difficult to perform reproduction at an appropriate reproduction time.

The present disclosure proposes an information processor, an information processing method, and a program which are new and improved and make it possible to improve convenience in reproduction of a captured image.

Means for Solving the Problem

According to the present disclosure, there is provided an information processor including a reproduction processing section that reproduces a captured image associated with tag information regarding a subject and identification information indicating relation of a plurality of pieces of the tag information on a basis of a set reproduction condition.

In addition, according to the present disclosure, there is provided an information processor including an association processing section that associates a captured image captured by an imaging apparatus with tag information regarding a subject and identification information indicating relation of a plurality of pieces of the tag information.

In addition, according to the present disclosure, there is provided an information processing method executed by an information processor, in which the method includes a step of reproducing a captured image associated with tag information regarding a subject and identification information indicating relation of a plurality of pieces of the tag information on a basis of a set reproduction condition.

In addition, according to the present disclosure, there is provided an information processing method executed by an information processor, in which the method includes a step of associating a captured image captured by an imaging apparatus with tag information regarding a subject and identification information indicating relation of a plurality of pieces of the tag information.

In addition, according to the present disclosure, there is provided a program that causes a computer to implement a function of reproducing a captured image associated with tag information regarding a subject and identification information indicating relation of a plurality of pieces of the tag information on a basis of a set reproduction condition.

In addition, according to the present disclosure, there is provided a program that causes a computer to implement a function of associating a captured image captured by an imaging apparatus with tag information regarding a subject and identification information indicating relation of a plurality of pieces of the tag information.

Effect of the Invention

According to the present disclosure, it is possible to improve convenience in reproduction of a captured image.

It is to be noted that above-mentioned effects are not necessarily limitative; in addition to or in place of the above effects, there may be achieved any of the effects described in the present specification or other effects that may be grasped from the present specification.

BRIEF DESCRIPTION OF THE DRAWINGS

FIG. 6 is an explanatory diagram illustrating an example of tag information according to the present embodiment.

MODES FOR CARRYING OUT THE INVENTION

Figure 1:
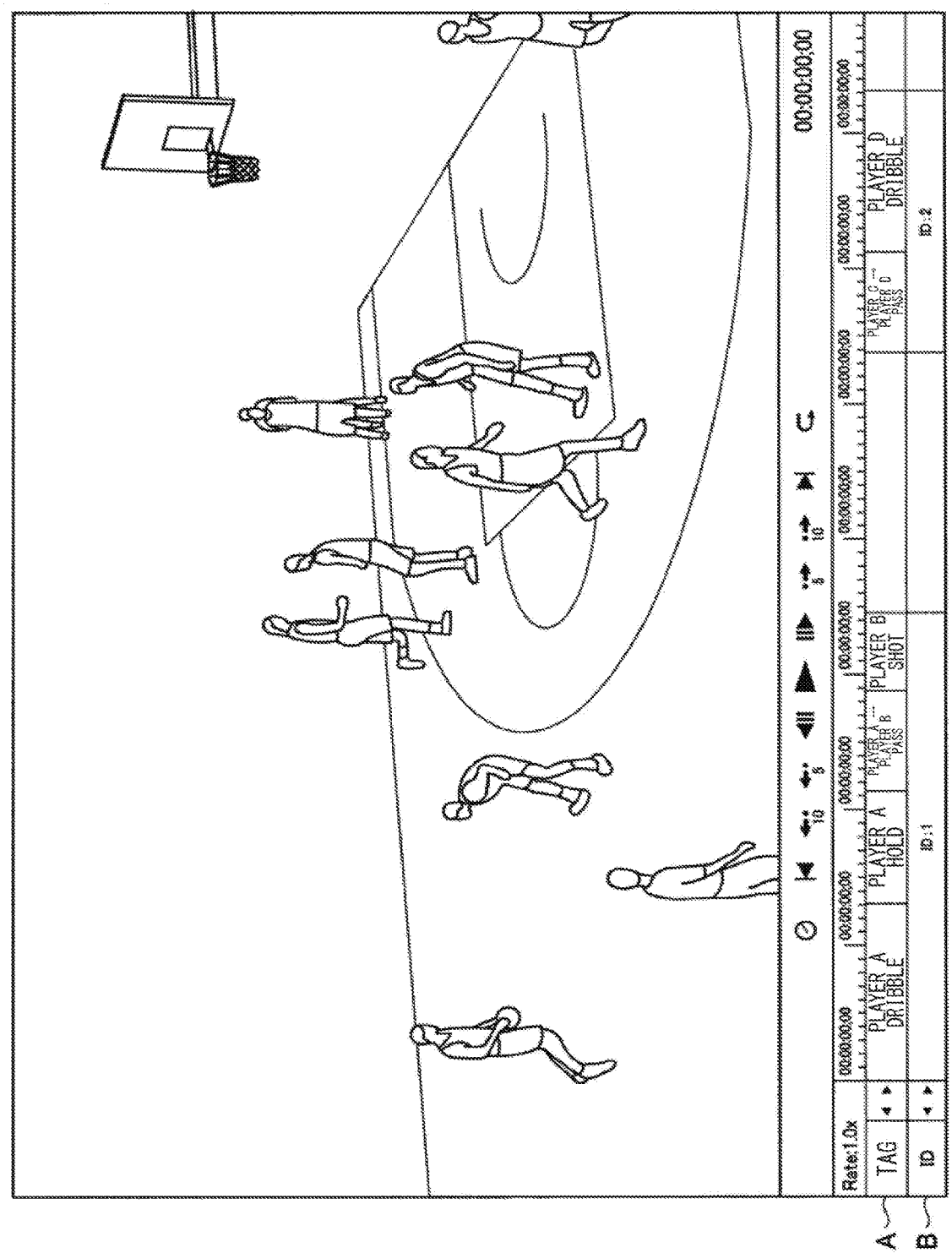
FIG. 1 is an explanatory diagram that describes an overview of an information processing method according to the present embodiment.

Hereinafter, description is given in detail of preferred embodiments of the present disclosure with reference to the accompanying drawings. It is to be noted that, in the present specification and drawings, repeated description is omitted for components substantially having the same functional configuration by assigning the same reference numerals.

In addition, hereinafter, description is given in the following order.
1. Information Processing Method according to Present Embodiment
[1] Overview of Information Processing Method according to Present Embodiment
[2] Example of Processing of Information Processing Method according to Present Embodiment
[3] Example of Effects Achieved by Using Information Processing Method according to Present Embodiment
[4] Application Example of Apparatuses Configuring Information Processing System according to Present Embodiment
2. Program According to Present Embodiment
(Information Processing Method According to Present Embodiment)

Hereinafter, a case is exemplified where processing of an information processing method according to the present embodiment is performed by an information processor according to the present embodiment. An example of a configuration of the information processor according to the present embodiment is described together with a description of an example of processing of the information processing method according to the present embodiment.

In addition, hereinafter, description is given mainly of an example in which the information processing method according to the present embodiment is applied to a case where an image of a region where basketball is played (an example of a region where a sport is played) is captured by an imaging apparatus. It is to be noted that the application example of the information processing method according to the present embodiment is not limited to such an example.

It is to be noted that, the example to which the information processing method according to the present embodiment is applied is not limited to an example in which an image of a region where basketball is played is captured by an imaging apparatus. The information processing method according to the present embodiment is applicable to any sport, for example, "ball games such as tennis, volleyball, and table tennis" and "sports other than the ball games, such as ice skating and judo".

In addition, an example in which the information processing method according to the present embodiment is applied is not limited to the example in which an image of a region where a sport is played is captured by the imaging apparatus. For example, the information processing method according to the present embodiment is applicable to a case where an image of any predetermined region (three-dimensional space) is captured by an imaging apparatus, such as a case where an image of a security target region is captured by the imaging apparatus.

In addition, hereinafter, a case is mainly exemplified where a captured image is a moving image. It is to be noted that, as described above, the captured image according to the present embodiment is not limited to a moving image, and may be a still image. In addition, the captured image according to the present embodiment may be associated with a sound (which may also include music) such as a sound generated by a sound input apparatus such as a microphone, in accordance with a predetermined image format. The sound with which the captured image is associated is usable, for example, for generation of excitement information described later.

[1] Overview of Information Processing Method According to Present Embodiment

As described above, there are needs for reproducing not only the entire captured image, but also a specific scene indicated by the captured image.

Therefore, the information processor according to the present embodiment sets, as a captured image to be reproduced, a captured image associated with tag information and identification information, and reproduces the captured image on the basis of a set reproduction condition (reproduction processing).

The tag information according to the present embodiment is data regarding a subject included in the captured image, and the tag information indicates the subject and an action content of the subject. Specific examples of the tag information are described later.

The identification information according to the present embodiment is data indicating relation of a plurality of pieces of tag information. Examples of the identification information include a unique ID assigned to the related tag information.

For example, recording tag information and identification information as metadata of a captured image allows the captured image to be associated with the tag information and the identification information. It is to be noted that the tag information and the identification information are not limited to being recorded as the metadata of the captured image, but the captured image may be associated therewith in any method that enables relation with the captured image.

FIG. 1 is an explanatory diagram that describes an overview of the information processing method according to the present embodiment, and illustrates an example of a reproduction screen for reproducing a captured image associated with tag information and identification information. A illustrated in FIG. 1 indicates contents of the tag information with which the captured image is associated, and, for example, the contents of the tag information with which the captured image is associated are displayed in time series. B illustrated in FIG. 1 indicates contents of identification information with which the captured image is associated. As illustrated in FIG. 1, for example, the contents of the identification information with which the captured image is associated and the contents of the plurality of pieces of tag information related with the identification information are displayed to be visually recognizable.

Note that it is needless to say that an example of the reproduction screen for reproducing the captured image associated with the tag information and the identification information is not limited to the example illustrated in FIG. 1.

Associating the captured image with the tag information and the identification information makes it possible to use, as an index, one or both of the tag information and the identification information to reproduce the captured image. That is, it can be said that each of the tag information and the identification information with which the captured image is associated is information that serves as an index for performing reproduction.

That is, examples of the reproduction condition according to the present embodiment include one or both of a condition for the tag information and a condition for the identification information. It is to be noted that the reproduction condition according to the present embodiment may include a condition that does not include one or both of the condition for the tag information and the condition for the identification information, such as a condition for generating the entire captured image.

Examples of the condition for the tag information include AND condition of specified tag information, NOR condition of the specified tag information, and NAND condition of the specified tag information. Note that it is needless to say that the example of the condition for the tag information is not limited to the examples described above.

Examples of the condition for the identification information include AND condition for specified identification information, NOR condition for the specified identification information, and NAND condition for the specified identification information. Note that it is needless to say that the example of the condition for the identification information is not limited to the examples described above.

The reproduction condition is set, for example, on the basis of an operation of the user. Examples of the operation related to setting of the reproduction condition include one or two or more of an operation using an operation unit (described later), an operation using an external operation device such as a remote controller, an operation by a gesture, and an operation by a sound.

It is to be noted that reproduction condition is not limited to being set on the basis of the operation of the user. The reproduction condition may be set on the basis of meta information related to the captured image. Examples of the meta information related to the captured image include excitement information in which a state of excitement for the content indicated by the captured image is digitized, and data indicating reproduction history of the captured image. The excitement information is generated, for example, using any technique that enables digitization of excitement for the content indicated by the captured image, such as analysis of SNS (Social Networking Service) data and analysis of sound data corresponding to the captured image. The processing of generating the excitement information may be performed by the information processor according to the present embodiment or may be performed by an apparatus external to the information processor according to the present embodiment.

Setting the reproduction condition on the basis of the operation of the user enables the user to cause the information processor according to the present embodiment to reproduce a desired scene in the captured image. In addition, setting the reproduction condition on the basis of the meta information related to the captured image allows for, for example, achievement of automatic reproduction of the captured image, such as loop reproduction. It is to be noted that the reproduction condition may be set by both the operation of the user and the meta information related to the captured image. Examples of the reproduction condition set by both the operation of the user and the meta information related to the captured image include a "reproduction condition set by the meta information related to the captured image and then changed on the basis of the operation of the user".

As described above, the information processor according to the present embodiment reproduces the captured image associated with the tag information and the identification information on the basis of the set reproduction condition. The tag information and the identification information with which the captured image is associated function as indices for performing reproduction; therefore, in a case of setting, as the reproduction condition, one or both of the condition for the tag information and the condition for the identification information, a specific scene indicated by the captured image (a scene that matches the reproduction condition) is reproduced.

Thus, it is possible for the information processor according to the present embodiment to satisfy the needs for reproducing a specific scene indicated by the captured image, thus making it possible to improve convenience in reproduction of the captured image.

It is to be noted that the processing of the information processing method according to the present embodiment is not limited to the above-described reproduction processing. For example, the information processor according to the present embodiment may further perform processing of associating the captured image with the tag information and the identification information (association processing). The example of the association processing according to the present embodiment is described later.

In addition, the information processing method according to the present embodiment may be applied to an information processing system including a first information processor that performs association processing and a second information processor that performs reproduction processing. The second information processor that performs the reproduction processing sets, as a processing target of the reproduction processing, a captured image associated with the tag information and the identification information in the external apparatus (first information processor that performs the association processing) or a captured image manually associated with the tag information and the identification information.

[2] Example of Processing of Information Processing Method According to Present Embodiment Next, description is given of an example of processing of the information processing method according to the foregoing present embodiment while illustrating an example of the information processing system to which the information processing method according to the present embodiment is applied. Hereinafter, a case is exemplified where one information processor performs both the association processing and the reproduction processing of the information processing method according to the present embodiment.

It is to be noted that, as described above, the association processing of the information processing method according to the present embodiment and the reproduction processing of the information processing method according to the present embodiment may be performed in separate information processors. In addition, the information processor that performs the reproduction processing of the information processing method according to the present embodiment is also able to set, as the processing target of the reproduction processing, the captured image manually associated with the tag information and the identification information.

Figure 2:
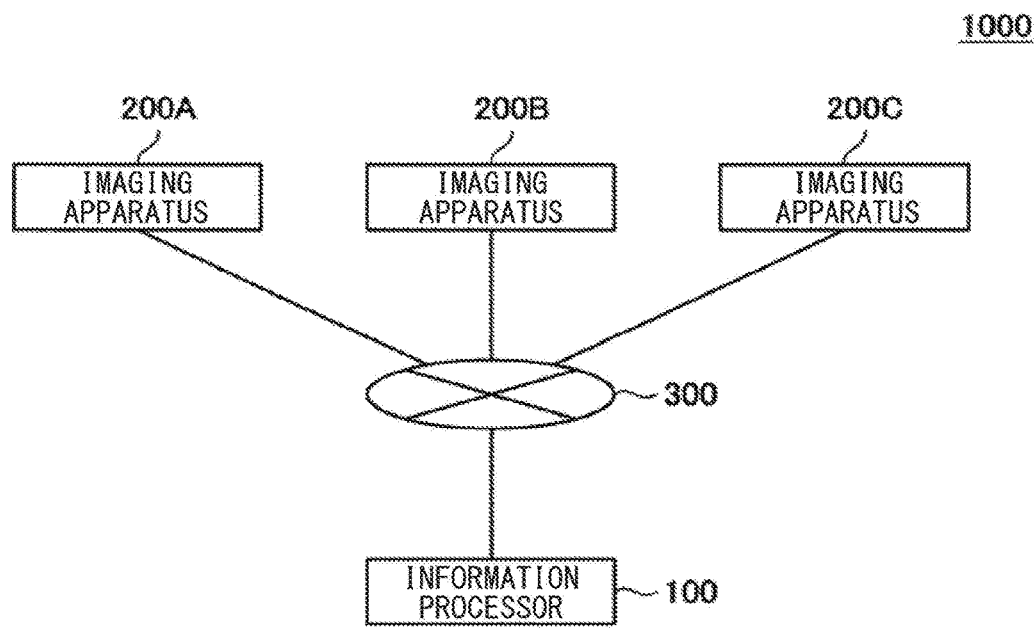
FIG. 2 is an explanatory diagram illustrating an example of an information processing system to which the information processing method according to the present embodiment is applied.

FIG. 2 is an explanatory diagram illustrating an example of an information processing system 1000 to which the information processing method according to the present embodiment is applied. The information processing system 1000 includes, for example, an information processor 100, and imaging apparatuses 200A, 200B, and 200C. Hereinafter, one of the imaging apparatuses 200A, 200B, and 200C may be referred to as an "imaging apparatus 200", or the imaging apparatuses 200A, 200B, and 200C may be collectively referred to as the "imaging apparatus 200", in some cases.

The information processor 100 and the imaging apparatus 200 are coupled wirelessly or wired via a network 300, for example, and communicate with each other by communication via the network 300. Examples of the network 300 according to the present embodiment include a wired network such as a LAN (Local Area Network) or a WAN (Wide Area Network), a wireless network such as a WLAN (Wireless Local Area Network), or the Internet using a communication protocol such as a TCP/IP (Transmission Control Protocol/Internet Protocol). It is to be noted that, in the information processing system according to the present embodiment, the information processor 100 and the imaging apparatus 200 are also able to directly communicate with each other without using the network 300.

It is to be noted that the configuration of the information processing system according to the present embodiment is not limited to the example illustrated in FIG. 1.

For example, although FIG. 1 illustrates the configuration including the three imaging apparatuses 200, the information processing system according to the present embodiment may be configured to include one imaging apparatus 200, two imaging apparatuses, or four or more imaging apparatuses 200. That is, the information processing system according to the present embodiment may include one or two or more imaging apparatuses 200.

In addition, the information processing system according to the present embodiment may further include a relay apparatus (not illustrated) that relays communication between the information processor 100 and the imaging apparatus 200. In addition, in the information processing system according to the present embodiment, the relay apparatus (not illustrated) may serve, for example, as a data aggregation/distribution apparatus having a function of aggregating various data such as image data and a function of distributing the various data. Examples of the relay apparatus (not illustrated) include a router.

In addition, the information processing system according to the present embodiment may further include, for example, some or all of a first storage apparatus, a parameter storage apparatus, a calibration processor of the imaging apparatus 200, an input apparatus, a display apparatus, and a second storage apparatus. It is to be noted that some or all of the functions of these apparatuses may be included in the information processor according to the present embodiment.

The first storage apparatus is an apparatus having a function of storing the captured image captured by the imaging apparatus 200. The first storage apparatus stores the captured image, thereby eliminating necessity of necessarily carrying out, in an imaging location, processing of a subsequent stage in the information processing system according to the present embodiment, such as processing of the information processing method according to the present embodiment. In addition, the first storage apparatus stores the captured image, thereby enabling the user to reproduce and view the captured image at a preferred timing. In addition, in a case where the information processing system according to the present embodiment includes no first storage apparatus, the imaging apparatus 200 may stream a signal (digital signal or analog signal) indicating the captured image to another apparatus such as the information processor according to the present embodiment.

The parameter storage apparatus is an apparatus having a function of storing internal parameters of the imaging apparatus 200 (e.g., a focal distance, a lens correction amount, etc.). The storage of the internal parameters in the parameter storage apparatus is performed in synchronization with the storage of the captured image in the first storage apparatus, for example. The storage of the internal parameters in the parameter storage apparatus is performed in synchronization with the storage of the captured image in the first storage apparatus, thereby enabling the user, for example, to more easily reproduce and view the captured image at a preferred timing.

The calibration processor of the imaging apparatus 200 is an apparatus having a function of acquiring status information of the imaging apparatus 200 indicating a position, viewpoint direction, or the like of the imaging apparatus 200. The calibration processor of the imaging apparatus 200 carries out arbitrary calibration on the basis of the internal parameters of the imaging apparatus 200 to acquire parameters indicating the position, viewpoint direction, or the like of the imaging apparatus 200. Then, the calibration processor of the imaging apparatus 200 stores the status information indicating the acquired parameters in association with the captured image of the imaging apparatus 200 (captured image corresponding to each of viewpoints of the imaging apparatuses 200).

The input apparatus is an apparatus that inputs region information indicating a region of which an image is captured by the imaging apparatus 200 to the information processor, etc. according to the present embodiment. Examples of the region information include three-dimensional data representing positions of a court, a ground, a goal position, and the like three-dimensionally. Examples of the input apparatus include a keyboard, a mouse, and a touch panel. The region information is generated, for example, by any operation such as mouse roll, drag and drop, pinch operation, flick operation, double touch operation, and the like. Use of a keyboard or a mouse as an input apparatus has an advantage of enabling detailed input, as compared with a case of using, as an input apparatus, a device enabling display and operation, such as a touch panel. Meanwhile, the use of the device enabling display and operation such as the touch panel as an input apparatus has an advantage of less equipment required for introduction because of no necessity of a separate device for input, as compared with the case of using the keyboard or the mouse as an input apparatus.

The display apparatus is an apparatus that is able to display, on a display screen, various images such as the captured image reproduced by the information processor according to the present embodiment.

The second storage apparatus is an apparatus that stores data after processing in the information processor according to the present embodiment (e.g., captured image associated with tag information and identification information). It is to be noted that the first storage apparatus and the second storage apparatus may be the same apparatus.

Here, for example, in a case where image capturing is performed by a plurality of imaging apparatuses 200 (i.e., in a case where image capturing is performed at a plurality of viewpoints) as in the information processing system 1000 illustrated in FIG. 1, data capacity of the stored captured image tends to be large. Therefore, only a portion of data indicating the captured image may be stored in the second storage apparatus. As an example, the second storage apparatus stores, as the portion of the data, data indicating the captured image associated with one or both of the tag information and the identification information set as the reproduction condition. Note that it is needless to say that the example of the portion of the data is not limited to the example described above. In addition, whether all the captured image data are stored in the second storage apparatus or a portion of the captured image data is stored in the second storage apparatus may be manually or automatically selected on the basis of data capacity storable by the second storage apparatus (e.g., storage capacity of a recording medium included in the second storage apparatus).

[2-1] Information Processor 100

The information processor 100 is an apparatus that performs processing of the information processing method according to the present embodiment. Hereinafter, a case is exemplified where the information processor 100 performs both the association processing and the reproduction processing of the information processing method according to the present embodiment.

Figure 3:
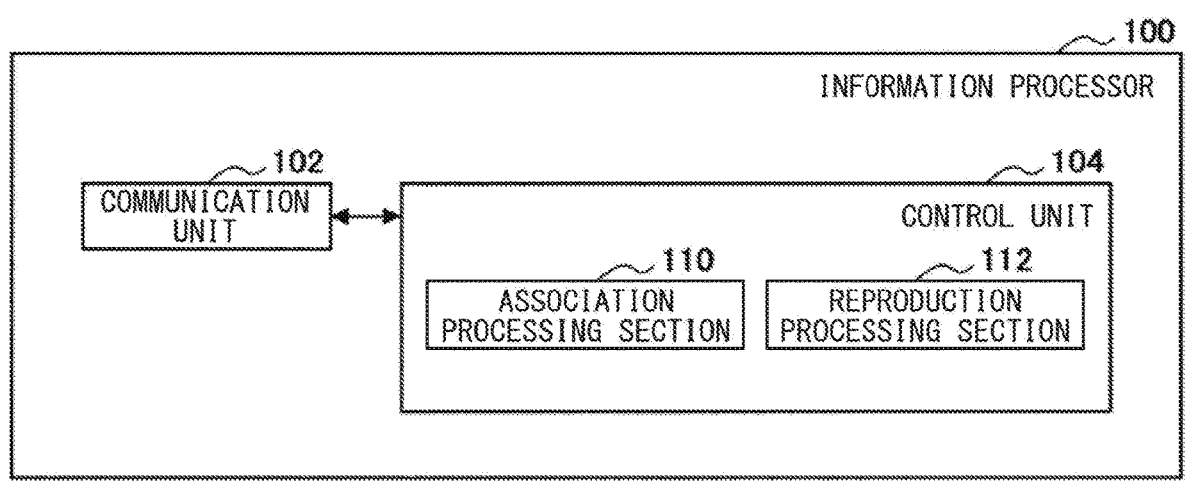
FIG. 3 is a block diagram illustrating an example of a functional configuration of an information processor according to the present embodiment.

FIG. 3 is a block diagram illustrating an example of a functional configuration of the information processor 100 according to the present embodiment. The information processor 100 includes, for example, a communication unit 102 and a control unit 104.

In addition, the information processor 100 may include, for example, a ROM (Read Only Memory; not illustrated), a RAM (Random Access Memory; not illustrated), a storage unit (not illustrated), an operation unit (not illustrated) operable by a user of the information processor 100, a display unit (not illustrated) that displays various screens on a display screen, or the like. In the information processor 100, the above-described components are coupled together, for example, by a bus as a data transmission path.

The ROM (not illustrated) stores control data such as programs and operation parameters to be used by the control unit 104. The RAM (not illustrated) temporarily stores programs, etc. to be executed by the control unit 104.

The storage unit (not illustrated) is a storage means included in the information processor 100, and stores, for example, various data such as data on the information processing method according to the present embodiment and various types of applications. Here, examples of the storage unit (not illustrated) include a magnetic recording medium such as a hard disk and a nonvolatile memory such as a flash memory. In addition, the storage unit (not illustrated) may be detachable from the information processor 100.

Examples of the operation unit (not illustrated) include an operation input device described later. In addition, examples of the display unit (not illustrated) include a display device described later. [Hardware Configuration Example of Information Processor 100]

Figure 4:
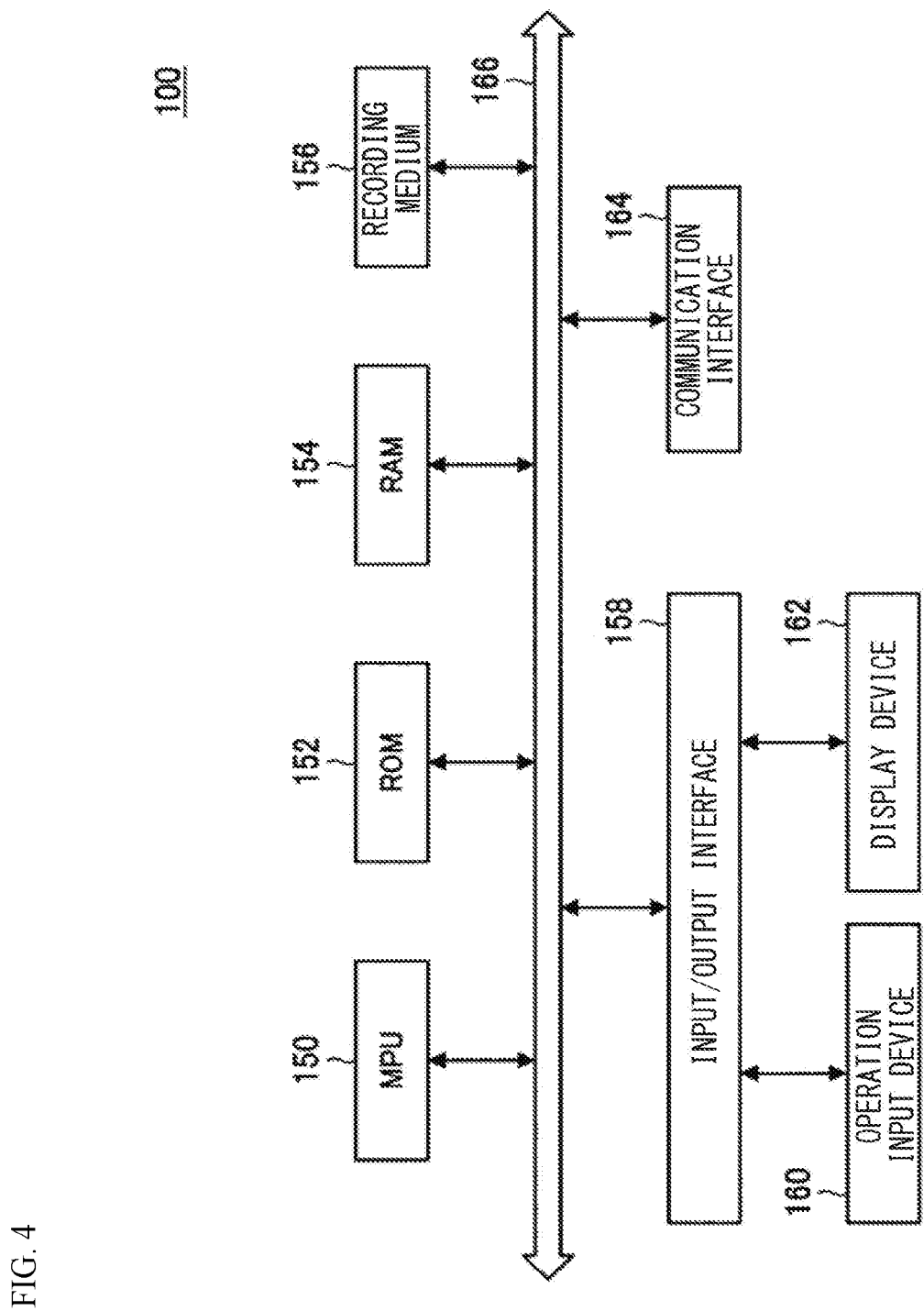
FIG. 4 is an explanatory diagram illustrating an example of a hardware configuration of the information processor according to the present embodiment.

FIG. 4 is an explanatory diagram illustrating an example of a hardware configuration of the information processor 100 according to the present embodiment. The information processor 100 includes, for example, an MPU 150, a ROM 152, a RAM 154, a recording medium 156, an input/output interface 158, an operation input device 160, a display device 162, and a communication interface 164. In addition, in the information processor 100, the components are coupled together, for example, by a bus 166 as a data transmission path. In addition, the information processor 100 is driven, for example, by power supplied from an internal power source, such as a battery, included in the information processor 100, or by power supplied from a coupled external power source.

The MPU 150 includes, for example, one or two or more processors configured by an arithmetic circuit such as an MPU (Micro Processing Unit), various types of processing circuits, or the like, and functions as the control unit 104 that controls the entire information processor 100. In addition, the MPU 150 serves, for example, as an association processing section 110 and a reproduction processing section 112, which are described later, in the information processor 100. It is to be noted that one or both of the association processing section 110 and the reproduction processing section 112 may be configured by a dedicated (or general-purpose) circuit (e.g., a processor separate from the MPU 150, etc.).

The ROM 152 stores control data such as programs and operation parameters to be used by the MPU 150. The RAM 154 temporarily stores programs to be executed by the MPU 150, for example.

The recording medium 156 functions as the storage unit (not illustrated), and stores various data such as data on the information processing method according to the present embodiment and various types of applications, for example. Here, examples of the recording medium 156 include a magnetic recording medium such as a hard disk and a nonvolatile memory such as a flash memory. In addition, the recording medium 156 may be detachable from the information processor 100.

The input/output interface 158 is coupled to, for example, the operation input device 160 and the display device 162. The operation input device 160 functions as the operation unit (not illustrated), and the display device 162 functions as the display unit (not illustrated). Here, examples of the input/output interface 158 include a USB (Universal Serial Bus) terminal, a DVI (Digital Visual Interface) terminal, an HDMI (High-Definition Multimedia Interface) (registered trademark) terminal, and various types of processing circuits.

In addition, the operation input device 160 is provided, for example, on the information processor 100, and is coupled to the input/output interface 158 inside the information processor 100. Examples of the operation input device 160 include a button, a direction key, a rotary selector such as a jog dial, or a combination thereof.

In addition, the display device 162 is provided, for example, on the information processor 100, and is coupled to the input/output interface 158 inside the information processor 100. Examples of the display device 162 include a liquid crystal display) or an organic EL display (also referred to as an Organic Electro-Luminescence Display, or an OLED display (Organic Light Emitting Diode Display)).

Note that it is needless to say that the input/output interface 158 is also able to be coupled to an external device such as an operation input device (e.g., keyboard or mouse) external to the information processor 100 and an external display device. In addition, the display device 162 may be, for example, a device that enables display and user operation, such as a touch panel.

The communication interface 164 is a communication means included in the information processor 100, and functions as the communication unit 102 for communicating wirelessly or wired with an external apparatus such as the imaging apparatus 200 via the network 300 (or directly). Here, examples of the communication interface 164 include a communication antenna and an RF (Radio Frequency) circuit (wireless communication), an IEEE802.15.1 port and a transmission/reception circuit (wireless communication), an IEEE802.11 port and a transmission/reception circuit (wireless communication), or a LAN (Local Area Network) terminal and a transmission/reception circuit (wired communication). In addition, the communication interface 164 may have any configuration corresponding to the network 300.

The information processor 100 performs processing of the information processing method according to the present embodiment by the configuration illustrated in FIG. 4, for example. It is to be noted that the hardware configuration of the information processor 100 according to the present embodiment is not limited to the configuration illustrated in FIG. 4.

For example, the information processor 100 need not include the communication interface 164 in a case of communicating with an external apparatus or the like via a coupled external communication device. In addition, the communication interface 164 may be configured to be able to communicate with one or two or more external apparatuses or the like by a plurality of communication methods.

In addition, the information processor 100 may further include an imaging device, for example. In a case where the information processor 100 includes the imaging device, the imaging device functions as an imaging unit (not illustrated) that generates a captured image (moving image or still image) by image capturing. In addition, in a case where the information processor 100 includes an imaging device, the information processor 100 may serve as the imaging apparatus 200.

In addition, the information processor 100 may further include, for example, a sound output device such as a speaker.

In addition, the information processor 100 can be configured not to include some or all of the recording medium 156, the operation input device 160, and the display device 162, for example.

In addition, the information processor 100 can be configured to be consistent with the application example of the information processor 100 described later, for example.

In addition, for example, some or all of the configuration illustrated in FIG. 4 (or a configuration according to a modification example) may be implemented by one or two or more ICs (integrated Circuit).

Description is given, with reference again to FIG. 3, of an example of the configuration of the information processor 100. The communication unit 102 is a communication means included in the information processor 100, and communicates wirelessly or wired with the external apparatus such as the imaging apparatus 200 via the network 300 (or directly). In addition, communication of the communication unit 102 is controlled by the control unit 104, for example.

Here, examples of the communication unit 102 include a communication antenna and an RF circuit, a LAN terminal and a transmission/reception circuit, and the like: however, the configuration of the communication unit 102 is not limited thereto. For example, the communication unit 102 may include a configuration corresponding to any standard that enables communication, such as a USB terminal and the transmission/reception circuit, or any configuration that enables communication with an external apparatus via the network 300. In addition, the communication unit 102 may be configured to enable communication with one or two or more external apparatuses, etc. by a plurality of communication methods.

The control unit 104 is configured by, for example, an MPU, and serves to control the entire information processor 100. In addition, the control unit 104 includes, for example, the association processing section 110 and the reproduction processing section 112, and plays a leading role in performing processing of the information processing method according to the present embodiment.

[2-1-1] Association Processing Section 110

The association processing section 110 plays a leading role in performing the association processing of the information processing method according to the present embodiment, and associates the captured image with the tag information and the identification information.

The association processing section 110 performs, for example, four types of processing indicated by the following (A), (B), (C), and (D) to thereby associate the captured image with the tag information and the identification information.

Figure 5:
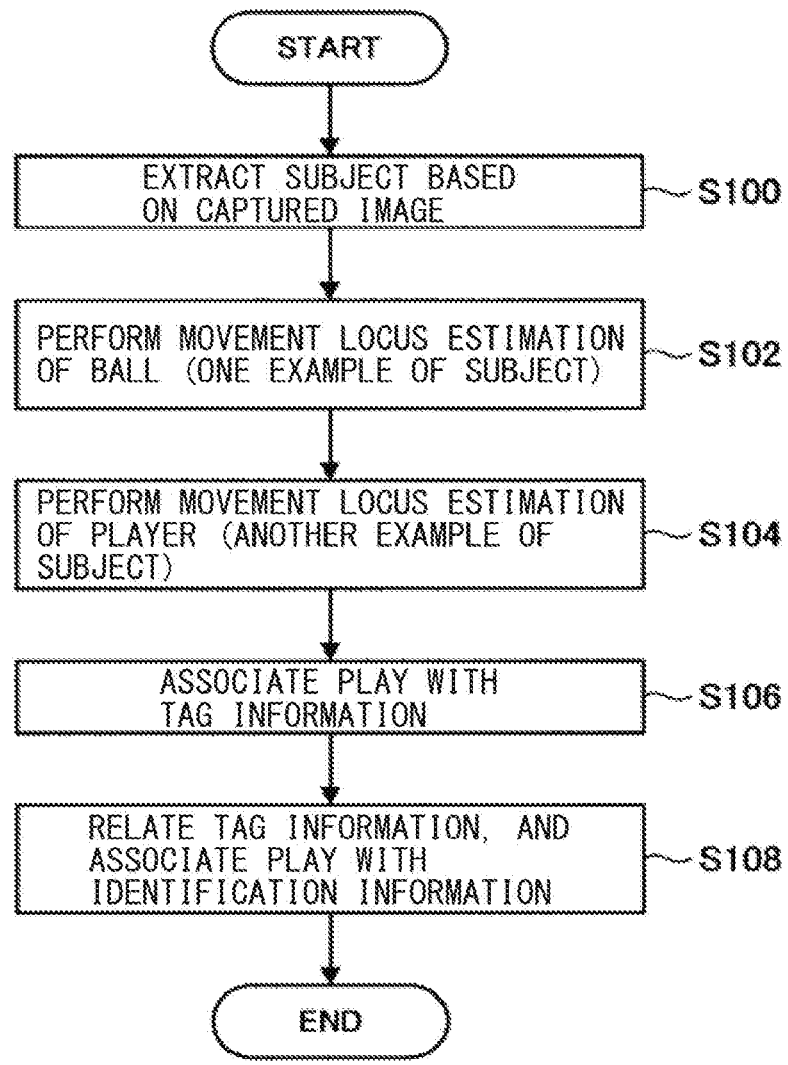
FIG. 5 is a flowchart illustrating an example of association processing of the information processing method according to the present embodiment.

FIG. 5 is a flowchart illustrating an example of the association processing of the information processing method according to the present embodiment. Hereinafter, description is given of an example of the association processing according to the present embodiment by exemplifying a case of processing a plurality of captured images captured at a plurality of viewpoints by the plurality of imaging apparatuses 200 as in the information processing system 1000 illustrated in FIG. 1.

(A) Subject Extraction Processing (Subject Analysis Processing): S100 of FIG. 5

The association processing section 110 extracts a subject from a captured image.

The association processing section 110 integrates, on the basis of a plurality of captured images and status information of the imaging apparatuses 200 having captured the respective captured images, objects included in the respective captured images as an object on a three-dimensional space, and generates three-dimensional data.

On the basis of the generated three-dimensional data, the association processing section 110 performs, for example, processing related to position estimation of a subject such as a ball or a player and processing related to an arbitrary object recognition technique such as face recognition or uniform number recognition to generate position information indicating estimation results of the position of the subject and subject information indicating recognition results of the subject. In addition, the association processing section 110 may perform processing related to posture estimation of the subject on the basis of the three-dimensional data to thereby further generate posture information indicating estimation results of the posture of the subject. The generation of the posture information makes it possible to generate tag information indicating a content with higher accuracy in tag information generation processing described later.

It is to be noted that, on the basis of some or all of processing capacity of a processor in the information processor 100, loading status of the processor, and setting of accuracy required for the content indicated by the tag information, for example, the association processing section 110 may change types of information generated on the basis of the three-dimensional data.

Each of the position information, the subject information, and the posture information generated on the basis of the three-dimensional data is information related with the subject included in the captured image. In addition, the three-dimensional data are data generated on the basis of the captured image. Thus, the generation of the position information, the subject information, and the posture information based on the three-dimensional data makes it possible to extract a subject from the captured image.

The association processing section 110 performs, for example, the processing described above to thereby extract a subject from the captured image. It is to be noted that although the above description exemplifies the generation of the three-dimensional data based on the captured image, it is needless to say that the subject extraction processing is not limited to the example of generating the three-dimensional data.

(B) Processing of Locus Estimation of Subject: S102 and S104 of FIG. 5

The association processing section 110 estimates a locus of the subject extracted from each of the captured images on the basis of captured images captured within a predetermined period. In the example illustrated in FIG. 5, a locus of a ball (one example of the subject) is estimated (S102), and a locus of a player (another example of the subject) is estimated (S104).

Examples of the captured image captured within the predetermined period include one or both of a frame image captured within the predetermined period (in a case where the captured image is a moving image) and a still image captured within the predetermined period (in a case where the captured image is a still image). The predetermined period may be a fixed period set in advance (e.g., a period from time of starting image capturing of the captured image to time of ending the image capturing, etc.), or may be a variable period set on the basis of an operation, etc. of the user.

Referring, as an example, to the case where the captured image is a moving image, the association processing section 110 processes the position information of the subject and the subject information, for example, as information for a certain plurality of frames to thereby estimate the locus of the ball and the locus of the player.

It is to be noted that the association processing section 110 may differentiate the estimated locus of the subject, for example, to thereby further generate motion information indicating motion of the subject. The generation of the motion information makes it possible to generate the tag information indicating a content with higher accuracy in the tag information generation processing described later. As an example, in a case where the information processing method according to the present embodiment is applied to a case where an imaging apparatus captures an image of a region where tennis is played (an example of a region where a sport is played), the association processing section 110 uses generated motion information of the ball to thereby be able to determine a moment of a stroke. Specifically, as for a speed vector of the ball, when both magnitude and a direction of the speed are changed, it is possible to determine the moment of the stroke.

(C) Tag Information Generation Processing: S106 of FIG. 5

The association processing section 110 generates tag information on the basis of the estimated locus of the subject, and associates the captured image with the generated tag information. The association processing section 110 records, for example, the generated tag information as metadata of the captured image to thereby associate the captured image with the tag information.

In a case where the information processing method according to the present embodiment is applied to a case where the imaging apparatus 200 captures an image of a region where basketball is played, the tag information generation processing corresponds to processing of associating a captured play with the tag information, as illustrated in step S106.

FIG. 6 is an explanatory diagram illustrating an example of the tag information according to the present embodiment, and illustrates an example of the tag information in a case where an image of the region where basketball is played is captured by the imaging apparatus 200. FIG. 6 illustrates an example in which a plurality of pieces of tag information is recorded in a table format; each row of the table illustrated in FIG. 6 corresponds to the tag information.

In the tag information, for example, time (A in FIG. 6), respective positions of extracted subjects (B in FIG. 6 and C in FIG. 6), and contents of the tag information (D in FIG. 6) are recorded in association with one another. The extracted subject corresponds to a subject indicated by the subject information, and the respective positions of the extracted subjects corresponds to positions indicated by the position information. The tag information includes the time (A in FIG. 6) and the contents of the tag information (D in FIG. 6), thereby causing the captured image and the contents of the tag information (D in FIG. 6) to be associated with each other. In addition, the tag information includes the respective positions of the extracted subjects (B in FIG. 6 and C in FIG. 6), thereby making it possible to easily perform processing of clipping a portion of a region including the subject in the reproduction processing described later.

It is to be noted that the tag information according to the present embodiment is not limited to the example illustrated in FIG. 6.

For example, the tag information need not include the respective positions of the extracted subjects (B in FIG. 6 and C in FIG. 6). Even in a case where the respective positions of the extracted subjects (B in FIG. 6 and C in FIG. 6) are not included in the tag information, it is possible to associate the captured image and the contents of the tag information (D in FIG. 6) with each other using the time (A in FIG. 6) and the contents of the tag information (D in FIG. 6).

In addition, it is needless to say that the tag information is not limited to data in a table format and that the number of subjects recorded in the tag information and the contents of the tag information are not limited to those corresponding to basketball as illustrated in FIG. 6.

The association processing section 110 generates the tag information in accordance with a set generation regulation of the tag information, for example. That is, the association processing section 110 generates the tag information on a rule-based basis, for example. The generation regulation of the tag information may be a fixed regulation set in advance, or may be a variable regulation that is changeable on the basis of an operation, etc. of the user.

Figure 7:
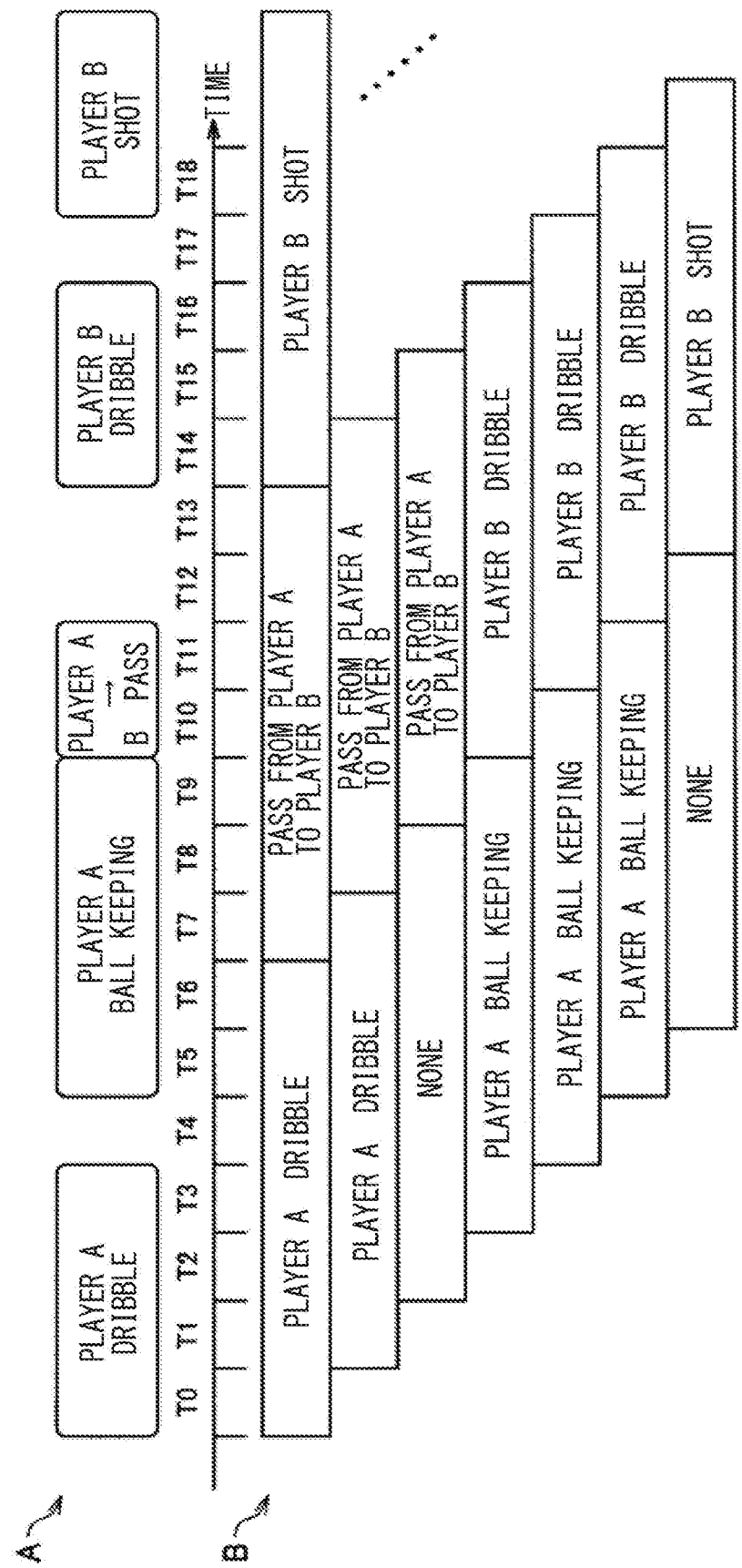
FIG. 7 is an explanatory diagram illustrating an example of tag information generation processing in the association processing of the information processing method according to the present embodiment.

FIG. 7 is an explanatory diagram illustrating an example of the tag information generation processing in the association processing of the information processing method according to the present embodiment. A of FIG. 7 illustrates an example of contents of the tag information that is finally generated. B of FIG. 7 illustrates an example of contents of intermediately generated tag information. FIG. 7 illustrates an example of a processing window for handling the position information of subjects in frame images of a plurality of frames.

Referring, as an example, to a case where the information processing method according to the present embodiment is applied to the case where the imaging apparatus 200 captures an image of a region where basketball is played, examples of the generation regulation of the tag information include the following. For the captured image in which an image of a region where basketball is played is captured, the tag information is generated regarding eight plays, for example, ball keeping, a dribble, a pass, a shot, throw-in, touch-line out, a goal, and a foul. Here, the ball keeping, the dribble, the pass, and the shot can be regarded as plays in which the relation continues, and the throw-in, the touch-line out, the goal, and the foul can be regarded as plays in which the relation with other plays is interrupted. Note that it is needless to say that the generation regulation of the tag information in a case of application to the image capturing of a region where basketball is played by the imaging apparatus 200 is not limited to the examples illustrated below.

Ball Keeping: in a half or more of the frames in the processing window, the position of the ball and the position of the player are within a distance of a certain threshold value, and the player is not moving.

Dribble: in a half or more of the frames in the processing window, the position of the ball and the position of the player are within a distance of a certain threshold value, and the player is moving.

Pass: in frames within the processing window, the position of the ball moves between two players, and each player keeps a ball in one frame or more.

Shot: in frames within the processing window, the position of the ball moves between the player and a goal, and the player keeps the ball in one frame or more.

Throw-in: in frames within the processing window, a frame is included in which the position of the ball is shifted from the outside of a court to the inside of the court.

Touch-Line Out: in frames within the processing window, a frame is included in which the position of the ball is shifted from the inside of the court to the outside of the court.

Goal: in frames in the processing window, a frame is included in which the position of the ball completely overlaps the position of the goal.

Foul: in a half or more of the frames in the processing window, the position of the ball and the position of a referee are within a distance of a certain threshold value.

Tag information corresponding to each of the above plays is given intermediately from the position of the ball and the position of the player in the processing window for handling position information on a plurality of frames. The association processing section 110 generates tag information corresponding to a plurality of plays at each time, and sets the most numerous given tag information corresponding to the play, as tag information corresponding to the play at the relevant time. In a case where there is a plurality of pieces of the most numerous given tag information corresponding to the play, the association processing section 110 sets, for example, a content indicated by the tag information corresponding to the play at the relevant time, as "no tag". It is to be noted that, in the case where there is the plurality of pieces of the most numerous given tag information corresponding to the play, the association processing section 110 may set a portion or all of the most numerous given tag information corresponding to the play, as the tag information corresponding to the play at the relevant time.

It is to be noted that the tag information generation processing is not limited to the processing of generating the tag information on the rule-based basis. For example, the association processing section may generate the tag information by machine learning. Examples of the machine learning involved with the generation of the tag information include learning using RNN (Recurrent Neural Network) that is one type of Deep Neural Network, Random Forest in which weak learners are combined, SVM (Support Vector Machine) that is a linear classifier, or the like. These types of machine learning are very widely applicable, but, in some instances, may require numerous learning data as well as correct labeling data in order to obtain sufficient determination performance. In a case where the machine learning is used in the tag information generation processing, it is sufficient to select a machine learning method in accordance with required determination accuracy and versatility.

(D) Identification Information Generation Processing: S108 of FIG. 5

The association processing section 110 relates the plurality of pieces of tag information generated in the tag information generation processing, and generates identification information for the plurality of related tag information. The association processing section 110 then associates the captured image with the generated identification information. The association processing section 110 records the generated identification information, for example, as metadata of the captured image to thereby associate the captured image with the identification information.

Assigning common identification information to the plurality of pieces of related tag information makes it possible to manage the tag information in relation with a unique identification information. In addition, assigning the common identification information to the plurality of pieces of related tag information makes it possible to perform processing that uses connection between the pieces of tag information in the reproduction processing described later.

In a case where the information processing method according to the present embodiment is applied to the case where the imaging apparatus 200 captures an image of a region where basketball is played, identification information generation processing corresponds to processing of associating the captured play with the identification information, as illustrated in step S108.

The association processing section 110 relates the plurality of pieces of tag information in accordance with, for example, a set relation regulation of the tag information. That is, the association processing section 110 generates the identification information on a rule-based basis, for example. The relation regulation of the identification information may be a fixed regulation set in advance, or may be a variable regulation that is changeable on the basis of an operation, etc. of the user.

Figure 8:
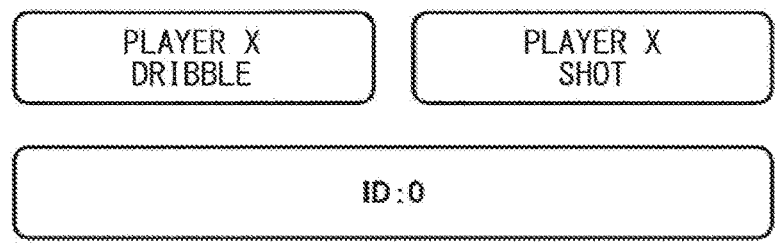
FIG. 8 is an explanatory diagram illustrating an example of identification information generation processing in the FIG. 9 is an explanatory diagram illustrating an example of identification information generation processing in the association processing of the information processing method according to the present embodiment.
Figure 9:
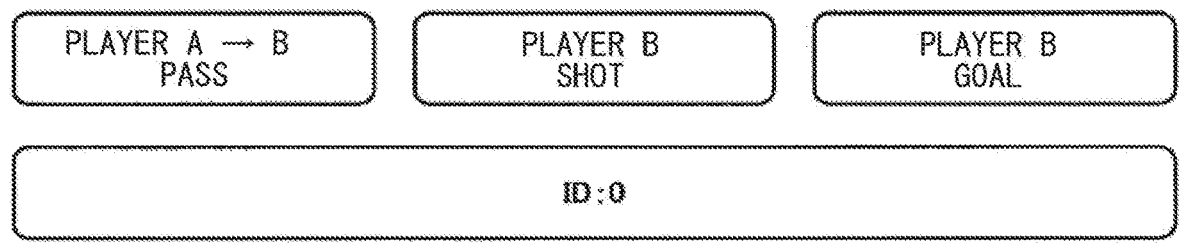
Figure 10:
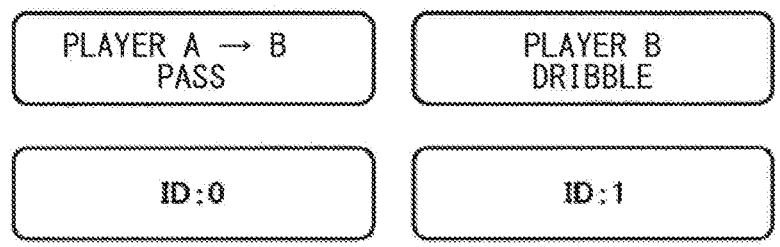
FIG. 10 is an explanatory diagram illustrating an example of identification information generation processing in the association processing of the information processing method according to the present embodiment.

FIGS. 8 to 10 are each an explanatory diagram illustrating an example of the identification information generation processing in the association processing of the information processing method according to the present embodiment, and each illustrate an example of the relation in accordance with the relation regulation of the tag information.

As illustrated in FIG. 8, when the same player performs a dribble and a shot consecutively, the same ID (an example of the identification information) is assigned to tag information corresponding to the dribble and tag information corresponding to the shot. That is, FIG. 8 is an example of relation in accordance with the relation regulation that relates a pattern of "dribble+shot".

As illustrated in FIG. 9, regardless of difference/coincidence between players and teams, the tag information is related with a play prior to the goal determination for a few minutes of the tag information to be set, and the same ID (an example of the identification information) is assigned to the related tag information. Although FIG. 9 illustrates an example in which the number of the tag information to be set is three, the number of the tag information regarding the relation regulation is not limited to the example illustrated in FIG. 9. That is, FIG. 9 is an example of relation in accordance with relation regulation that relates the tag information for a few minutes of the tag information to be set when goal determination is made.

FIG. 10 is an example of relation in accordance with relation regulation in which "no relation is made when a pass is given to a different team player". As illustrated in FIG. 10, the relation regulation of the tag information may include a regulation of not relating the tag information.

In accordance with the association regulations as illustrated in FIGS. 8 to 10, for example, the association processing section 110 relates the tag information, and generates identification information for the related tag information. Here, priority may be set for the association regulation to cause the association processing section 110 to relate the tag information in accordance with association regulation with higher priority.

It is to be noted that the association regulation of the tag information according to the present embodiment is not limited to the examples described above.

For example, when "a difference between the end time of a play included in single tag information and the start time of a play included in another tag information, and" "a difference between the position of a subject included in the single tag information and the position of a subject included in the other tag information" are each equal to or within a set threshold value, the association processing section 110 may set these piece of tag information as related tag information.

It is to be noted that the identification information generation processing is not limited to the identification information generation processing on the rule-based basis. For example, the association processing section may generate the identification information by machine learning. Examples of the machine learning involved with the generation of the identification information include learning using RNN that is one type of Deep Neural Network, Random Forest in which weak learners are combined, SVM that is a linear classifier, or the like. In a case where the machine learning is used in the identification information generation processing, it is sufficient to select a machine learning method in accordance with required determination accuracy and versatility, similarly to the case of using the machine learning in the tag information generation processing.

The association processing section 110 performs the above-mentioned four types of processing indicated by (A), (B), (C), and (D), for example, to thereby associate the captured image with the tag information and the identification information. It is to be noted that the above-mentioned four types of processing indicated by (A), (B), (C), and (D) are those into which the association processing according to the present embodiment is divided for the sake of convenience; the way of dividing the association processing according to the present embodiment is not limited to the example described above.

[2-1-2] Reproduction Processing Section 112

The reproduction processing section 112 plays a leading role in the reproduction processing of the information processing method according to the present embodiment described above, and reproduces the captured image associated with the tag information and the identification information on the basis of a set reproduction condition.

As described above, the reproduction condition is set on the basis of the operation of the user, or is set on the basis of the meta information related to the captured image. In addition, as described above, the reproduction condition may include one or both of the condition for the tag information and the condition for the identification information.

Referring, as an example, to a case where the condition for the tag information is set as the reproduction condition on the basis of the operation of the user, the user is able to set the reproduction condition in detail, thus enabling the user to reproduce a scene that is desired to be reproduced by the user. At this time, it is possible to reduce complexity of the user in operating settings of the reproduction condition by selecting a key event such as goal or free throw and then selecting tag information corresponding to each individual play.

Referring, as an example, to a case of setting a condition for the identification information as the reproduction condition on the basis of the operation of the user, setting a condition for identification information enables the user to reproduce a scene corresponding to a series of plays related by the identification information. Therefore, in a case of setting the condition for the identification information as the reproduction condition, it is possible for the user to reproduce a scene that is desired to be reproduced more easily than a case of setting the above-described condition for the tag information as the reproduction condition. At this time, selecting a key event such as goal or free throw and then selecting identification information makes it possible to reproduce a play leading to the event without interruption.

In a case of setting, as the reproduction condition, the condition for the tag information and the condition for the identification information on the basis of the operation of the user, the user is able to reproduce some of plays corresponding to the tag information among scenes corresponding to the series of plays related by the identification information.

Setting the reproduction condition as described above on the basis of the operation of the user allows the user to be relieved from the complexity of performing analog-like reproduction region settings in a temporal direction, thus improving convenience in the reproduction of the captured image.

Referring, as an example, to a case of setting a reproduction condition on the basis of the meta information related to the captured image, the reproduction processing section 112 automatically sets the condition for the identification information corresponding to a time point at which it is determined that excitement surges on the basis of the excitement information (an example of the meta information). As described above, automatically setting the reproduction condition enables the reproduction processing section 112 to reproduce scenes corresponding to a series of plays from the excited part without requiring the operation of the user. In addition, automatically setting the reproduction condition as described above makes it possible to achieve automatic looping of the captured image.

Referring, as another example, to a case of setting the reproduction condition on the basis of the meta information related to the captured image, the reproduction processing section 112 specifies a reference event or how many tag information-unit-based plays are reproduced from the event on the basis of data indicating reproduction history of the captured image, and automatically sets the reproduction condition corresponding to specified results. Automatically setting the reproduction condition as described above enables the reproduction processing section 112 to automatically reproduce a recommended scene. In addition, automatically setting the reproduction condition as described above makes it possible to achieve automatic looping of the captured image.

It is to be noted that the reproduction processing according to the present embodiment is not limited to the examples described above. The reproduction processing section 112 may further perform one or both of the following processing (a) and the following processing (b), for example, as the reproduction processing.

(a) Processing of Selection of Imaging Apparatus 200

For example, in a case where there is a plurality of imaging apparatuses 200 performing image capturing at different viewpoints as in the information processing system 1000 illustrated in FIG. 1, the reproduction processing section 112 may reproduce the captured image captured by a selected imaging apparatus 200.

The imaging apparatus 200 is selected on the basis of an operation of the user, for example. In this case, the reproduction processing section 112 reproduces the captured image captured by the selected imaging apparatus 200 on the basis of the operation of the user.

In addition, the imaging apparatus 200 may be selected by selecting one or both of the tag information and the identification information. As described above, the reproduction condition may include one or both of the condition for the tag information and the condition for the identification information. Thus, it is also possible for the reproduction processing section 112 to automatically select the imaging apparatus 200 in conjunction with the setting of the reproduction condition and to reproduce the captured image captured by the selected imaging apparatus 200.

Here, in a case of selecting the imaging apparatus 200 on the basis of the tag information (including tag information specified indirectly from the identification information), the reproduction processing section 112 selects the imaging apparatus 200 close to the subject or the imaging apparatus 200 that has captured an image of a face of the subject, on the basis of, for example, one or both of a position of the subject indicated by the position information and a content indicated by the subject information. Selecting the imaging apparatus 200 as described above enables the reproduction processing section 112 to reproduce a captured image in which the play is more likely to be seen.

It is to be noted that the imaging apparatus 200 may be selected by both the operation of the user and selection of one or both of the tag information and the identification information. Examples of the imaging apparatus 200 to be selected by both the operation of the user and the selection of one or both of the tag information and the identification information include an "imaging apparatus 200 set by the selection of one or both of the tag information and the identification information and then changed on the basis of the operation of the user".

(b) Clipping Processing (Image Cropping Processing)

The reproduction processing section 112 clips, from the captured image to be reproduced, a portion of a region including the subject corresponding to the tag information with which the captured image to be reproduced is associated.

Figure 11:
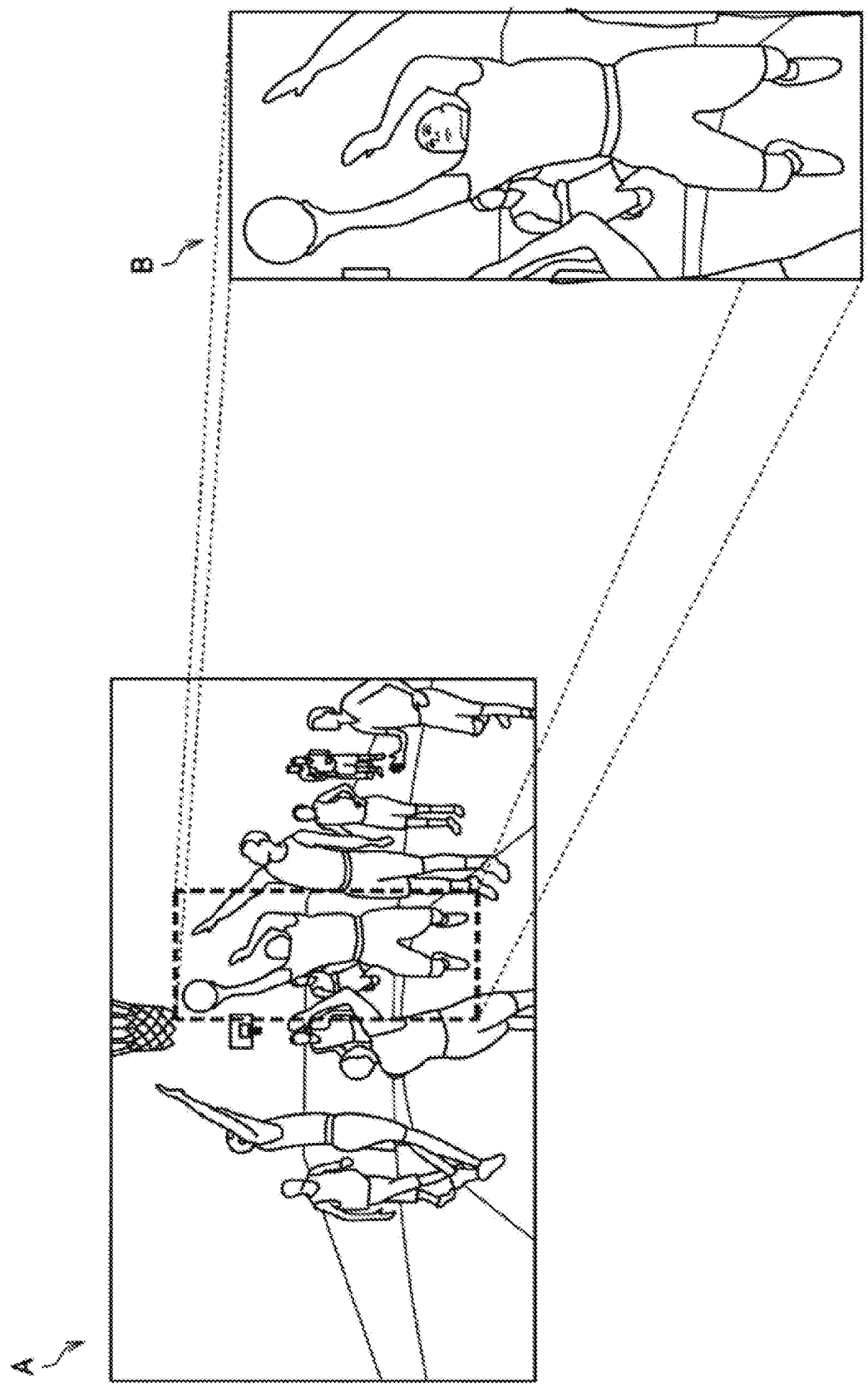
FIG. 11 is an explanatory diagram illustrating an example of clipping processing in reproduction processing of the information processing method according to the present embodiment.

FIG. 11 is an explanatory diagram illustrating an example of the clipping processing in the reproduction processing of the information processing method according to the present embodiment. A of FIG. 11 illustrates an example of the captured image (frame image or still image) captured at a certain time point. B of FIG. 11 illustrates an example of an image (still image) clipped from the captured image illustrated in A of FIG. 11.

For example, as illustrated in FIG. 6, the tag information may include respective positions of extracted subjects. The reproduction processing section 112 clips a specific region from the captured image (crops a specific region from the captured image) by referring, for example, to the respective positions of the extracted subjects included in the tag information with which the captured image to be reproduced is associated to thereby obtain an image illustrated in B of FIG. 11 from the captured image illustrated in A of FIG. 11.

The reproduction processing section 112 performs the above-described clipping processing, thereby making it possible to achieve, for example, generation of a headline image in automated article generation. Note that it is needless to say that use application to which the clipping processing is applied is not limited to the example described above.

The control unit 104 includes, for example, the association processing section 110 to thereby play a leading role in performing the association processing of the information processing method according to the present embodiment. In addition, the control unit 104 includes, for example, the reproduction processing section 112 to thereby play a leading role in performing the reproduction processing of the information processing method according to the present embodiment.

It is to be noted that the functional configuration of the control unit 104 is not limited to the example illustrated in FIG. 3.

For example, the control unit 104 may have any configuration depending on the way of dividing the functions of the information processor 100, such as a configuration depending on the way of dividing the processing of the information processing method according to the present embodiment.

As an example, in a case where the information processor 100 has no function of performing the association processing, the control unit 104 need not include the association processing section 110. As another example, in a case where the information processor 100 has no function of performing the reproduction processing, the control unit 104 need not include the reproduction processing section 112.

For example, the configuration illustrated in FIG. 3 allows the information processor 100 to perform the processing of the information processing method according to the present embodiment. Accordingly, for example, the configuration illustrated in FIG. 3 makes it possible for the information processor 100 to improve the convenience in the reproduction of the captured image.

In addition, for example, the configuration illustrated in FIG. 3 makes it possible for the information processor 100 to achieve the effects implemented by performing the processing of the information processing method according to the present embodiment.

It is to be noted that the configuration of the information processor according to the present embodiment is not limited to the configuration illustrated in FIG. 3.

For example, the information processor according to the present embodiment may include one or both of the association processing section 110 and the reproduction processing section 112 illustrated in FIG. 3, separately from the control unit 104 (e.g., may be implemented by another processing circuit).

In addition, the configuration for achieving the processing of the information processing method according to the present embodiment is not limited to the configuration illustrated in FIG. 3, but may be any configuration depending on the way of dividing the functions of the information processor 100, such as a configuration depending on the way of dividing the processing of the information processing method according to the present embodiment.

As an example, the information processor according to the present embodiment may be configured not to include one of the association processing section 110 and the reproduction processing section 112 illustrated in FIG. 3.

As another example, the information processor according to the present embodiment may be configured to perform some or all of the above-described "respective functions of the first storage apparatus, the parameter storage apparatus, the calibration processor of the imaging apparatus 200, the input apparatus, the display apparatus, and the second storage apparatus".

In addition, for example, in a case of communicating with an external apparatus via an external communication device having a function and a configuration similar to those of the communication unit 102, the information processor according to the present embodiment need not include the communication unit 102.

[2-2] Imaging Apparatus 200

The imaging apparatus 200 is an imaging apparatus disposed to capture an image of a target image capturing region, for example, such as a region where a sport is played, and generates a captured image (moving image or still image) by image capturing.

The imaging apparatus 200 includes, for example, a lens/imaging element and a signal processing circuit. The lens/imaging element is configured by, for example, a lens of an optical system and an image sensor using a plurality of imaging elements such as CMOS (Complementary Metal Oxide Semiconductor). The signal processing circuit includes, for example, an AGC (Automatic Gain Control) circuit or an ADC (Analog to Digital Converter), and converts an analog signal generated by the imaging element into a digital signal (image data). In addition, the signal processing circuit performs various types of processing of RAW development, for example. Further, the signal processing circuit may perform, for example, various types of signal processing such as White Balance correction processing, color tone correction processing, gamma correction processing, YCbCr conversion processing, and edge enhancement processing. Further, the imaging apparatus 200 may be able to perform any image processing by utilizing an operation resource of the signal processing circuit.

In addition, the imaging apparatus 200 includes, for example, a communication device, or an external communication device is coupled to the imaging apparatus 200. The imaging apparatus 200 communicates wirelessly or wired with an external apparatus such as the information processor 100 via the network 300 (or directly) by means of the communication device included therein or the external communication device coupled thereto.

In addition, the imaging apparatus 200 may include a display device, or an external display device may be coupled to the imaging apparatus 200.

It is to be noted that the configuration of the imaging apparatus 200 is not limited to the above-described example, but may have a configuration corresponding to the application example of the imaging apparatus 200 described later.

[3] Example of Effects Achieved by Using Information Processing Method According to Present Embodiment The use of the information processing method according to the present embodiment achieves the following effects, for example. Note that it is needless to say that the effects achieved by using the information processing method according to the present embodiment are not limited to the examples listed below.

It is possible to automatically convert sports plays into data from the position of the ball and the position of the player, thus making it possible to reduce trouble of a user.

Converting the sports plays into data makes it possible to automatically perform scoring of a game content. In addition, it is possible to associate a captured image with more abstract tag information such as a play that determines winning and losing of a game, and to easily generate a headline image of automated article generation and a retrospective moving image of the play utilizing the tag information from the captured image.

Converting the sports plays into data as the tag information makes it possible to handle plays with different lengths as one data unit. Thus, it becomes possible to more easily achieve digest reproduction or loop reproduction for reviewing plays.

[4] Application Example of Apparatuses Configuring Information Processing System according to Present Embodiment Although the description has been given above referring to the information processor as a component of the information processing system according to the present embodiment, the present embodiment is not limited to such an embodiment. The present embodiment is applicable to various apparatuses, which are able to perform processing of the information processing method according to the present embodiment, for example, a "computer such as a PC (Personal Computer) or a server", a "tablet-type apparatus", a "game machine", or a "camera such as a digital still camera or a digital video camera". In addition, the present embodiment is also applicable to, for example, a processing IC that is able to be incorporated into the above-mentioned apparatuses.

In addition, the information processor according to the present embodiment may be applied, for example, to a processing system, which assumes coupling to a network (or communication between apparatuses), such as cloud computing. Examples of the processing system in which the processing of the information processing method according to the present embodiment is performed include "a system in which a portion of processing of the information processing method according to the present embodiment is performed by one apparatus that configures the processing system, and processing other than the portion of the processing of the information processing method according to the present embodiment is performed by another apparatus that configures the processing system".

In addition, although the description has been given referring to the imaging apparatus as a component of the information processing system according to the present embodiment, the present embodiment is not limited to such an embodiment. In the present embodiment, examples thereof include any apparatus having an imaging function including a "camera such as a digital still camera or a digital video camera", "a communication apparatus that is able to perform image capturing such as a smartphone or a mobile phone", "a tablet-type apparatus that is able to perform image capturing", and "a game machine that is able to perform image capturing". In addition, as described above, in the information processing system according to the present embodiment, the information processor according to the present embodiment may also serve as the imaging apparatus.

(Program According to Present Embodiment)

A program that causes a computer system to function as the information processor according to the present embodiment (e.g., a program that is able to execute processing of the information processing method according to the present embodiment, such as "association processing", "reproduction processing", or "association processing and reproduction processing") is executed by a processor or the like in the computer system, thereby making it possible to improve convenience in reproduction of a captured image. Here, examples of the computer system according to the present embodiment include a single computer or a plurality of computers. The computer system according to the present embodiment allows for a series of processing of the information processing method according to the present embodiment.

In addition, the program that causes the computer system to function as the information processor according to the present embodiment is executed by the processor or the like in the computer system, thereby making it possible to achieve the effects implemented by the processing of the information processing method according to the present embodiment described above.

Although the description has been given above in detail of preferred embodiments of the present disclosure with reference to the accompanying drawings, the technical scope of the present disclosure is not limited to such examples. It is obvious that a person having ordinary skill in the art of the present disclosure may find various alterations or modifications within the scope of the technical idea described in the claims, and it should be understood that these alterations and modifications naturally come under the technical scope of the present disclosure.

For example, the above description sets forth the provision of the program (computer program) that causes the computer system to function as the information processor according to the present embodiment; however, in the present embodiment, it is also possible to provide a recording medium together in which the above program is stored.

The above-described configuration represents an example of the present embodiment, and naturally comes under the technical scope of the present disclosure.

In addition, the effects described herein are merely illustrative or exemplary, and are not limitative. That is, the technology according to the present disclosure may achieve, in addition to or in place of the above effects, other effects that are obvious to those skilled in the art from the description of the present specification.

It is to be noted that the technical scope of the present disclosure also includes the following configurations.

(1)
An information processor including a reproduction processing section that reproduces a captured image associated with tag information regarding a subject and identification information indicating relation of a plurality of pieces of the tag information on a basis of a set reproduction condition.

(2)
The information processor according to (1), in which the reproduction condition includes one or both of a condition for the tag information and a condition for the identification information.

(3)
The information processor according to (1) or (2), in which the reproduction condition is set on a basis of an operation of a user.

(4)
The information processor according to any one of (1) to (3), in which the reproduction condition is set on a basis of meta information related to the captured image.

(5)
The information processor according to any one of (1) to (4), in which the reproduction processing section reproduces the captured image captured by a selected imaging apparatus.

(6)
The information processor according to (5), in which the imaging apparatus is selected on a basis of an operation of the user.

(7)
The information processor according to (5) or (6), in which the imaging apparatus is selected by selecting one or both of the tag information and the identification information.

(8)
The information processor according to any one of (1) to (7), in which the reproduction processing section clips, from the captured image to be reproduced, a portion of a region including a subject corresponding to the tag information with which the captured image to be reproduced is associated.

(9)
The information processor according to any one of (1) to (8), further including an association processing section that associates a captured image captured by the imaging apparatus with the tag information and the identification information.

(10)
An information processor including an association processing section that associates a captured image captured by an imaging apparatus with tag information regarding a subject and identification information indicating relation of a plurality of pieces of the tag information.

(11)
The information processor according to (10), in which
the association processing section extracts a subject from the captured image,
the association processing section estimates, on a basis of a plurality of the captured images captured within a predetermined period, a locus of the subject extracted from each of the captured images,
the association processing section generates the tag information on a basis of the estimated locus of the subject, and
the association processing section associates the captured image with the generated tag information.

(12)
The information processor according to (11), in which the association processing section generates the tag information in accordance with a set generation regulation of the tag information.

(13)
The information processor according to (11), in which the association processing section generates the tag information by machine learning.

(14)
The information processor according to any one of (11) to (13), in which
the association processing section relates the plurality of pieces of the tag information in accordance with a set relation regulation of the tag information,
the association processing section generates the identification information for the plurality of pieces of the related tag information, and
the association processing section associates the captured image with the generated identification information.

(15)
The information processor according to any one of (11) to (13), in which
the association processing section relates the plurality of pieces of the tag information by machine learning, the association processing section generates the identification information for the plurality of pieces of the related tag information, and the association processing section associates the captured image with the generated identification information.

(16)

An information processing method executed by an information processor, the method including a step of reproducing a captured image associated with tag information regarding a subject and identification information indicating relation of a plurality of pieces of the tag information on a basis of a set reproduction condition.

(17)

An information processing method executed by an information processor, the method including a step of associating a captured image captured by an imaging apparatus with tag information regarding a subject and identification information indicating relation of a plurality of pieces of the tag information.

(18)

A program that causes a computer to implement a function of reproducing a captured image associated with tag information regarding a subject and identification information indicating relation of a plurality of pieces of the tag information on a basis of a set reproduction condition.

(19)

A program that causes a computer to implement a function of associating a captured image captured by an imaging apparatus with tag information regarding a subject and identification information indicating relation of a plurality of pieces of the tag information.

REFERENCE NUMERALS LIST 100 information processor
102 communication unit
104 control unit
110 association processing section
112 reproduction processing section
200, 200A, 200B, and 200C imaging apparatus
300 network
1000 information processing system

The invention claimed is:

1. An information processor comprising:
circuitry configured to:
determine a relationship between first tag information and second tag information;
associate a first captured image corresponding to the first tag information and a second captured image corresponding to the second tag information with a same first identification information based upon the relationship between the first tag information and the second tag information, the first captured image being different from the second captured image, the first tag information being different from the first identification information, the second tag information being different from the first identification information, and the first identification information being a unique identifier of the first tag information and the second tag information;
associate a third captured image corresponding to third tag information with second identification information, the third captured image being different from the first captured image and the second captured image, the third tag information being different from the second identification information, the second identification information being a unique identifier of the third tag information, and the second identification information being different from the first identification information; and
reproduce at least one of the first captured image, the second captured image, and the third captured image on a basis of a set reproduction condition,
wherein the first captured image, the second captured image, and the third captured image are all a part of a same content.

2. The information processor according to claim 1, wherein the reproduction condition includes at least one of a condition for the first tag information, a condition for the second tag information, a condition for the third tag information, a condition for the first identification information, and a condition for the second identification information.

3. The information processor according to claim 1, wherein the reproduction condition is set on a basis of an operation of a user.

4. The information processor according to claim 1, wherein the reproduction condition is set on a basis of meta information related to at least one of the first captured image, the second captured image, and the third captured image.

5. The information processor according to claim 1, wherein the first captured image, the second captured image, and the third captured image are captured by a selected imaging apparatus.

6. The information processor according to claim 5, wherein the imaging apparatus is selected on a basis of an operation of a user.

7. The information processor according to claim 5, wherein the imaging apparatus is selected by selecting at least one of the first tag information, the second tag information, the third tag information, the first identification information, and the second identification information.

8. The information processor according to claim 1, wherein the circuitry is configured to clip, from one of the first, second, and third captured images, a portion of a region including a subject corresponding to one of the first, second, and third tag information with which the one of the first, second, and third captured images is associated.

9. The information processor according to claim 1, wherein the circuitry is configured to:
associate the first captured image captured by an imaging apparatus with the first tag information;
associate the second captured image captured by the imaging apparatus with the second tag information; and
associate the third captured image captured by the imaging apparatus with the third tag information.

10. An information processor comprising:
circuitry configured to:
associate a first captured image captured by an imaging apparatus with first tag information;
associate a second captured image captured by the imaging apparatus with second tag information, the first captured image being different from the second captured image;
associate a third captured image captured by the imaging apparatus with third tag information, the third captured image being different from the first captured image and the second captured image;
determine a relationship between the first tag information and the second tag information;
associate the first captured image corresponding to the first tag information and the second captured image corresponding to the second tag information with a same first identification information based upon the relationship between the first tag information and the second tag information, the first tag information being different from the first identification information, the second tag information being different from the first identification information, and the first identification information being a unique identifier of the first tag information and the second tag information; and associate the third captured image corresponding to the third tag information with second identification information, the third tag information being different from the second identification information, the second identification information being a unique identifier of the third tag information, and the second identification information being different from the first identification information, wherein the first captured image, the second captured image, and the third captured image are all a part of a same content.

11. The information processor according to claim 10, wherein the circuitry is configured to:
extract a subject from the first captured image,
estimate, on a basis of a plurality of captured images captured within a predetermined period, a locus of the subject extracted from each of the captured images,
generate the first tag information on a basis of the estimated locus of the subject, and
associate the first captured image with the generated first tag information.

12. The information processor according to claim 11, wherein the circuitry is configured to generate the first, second, and third tag information in accordance with a set generation regulation.

13. The information processor according to claim 11, wherein the circuitry is configured to generate the first, second, and third tag information by machine learning.

14. The information processor according to claim 11, wherein the circuitry is configured to:
generate the first identification information for the first and second tag information; and
generate the second identification information for the third tag information.

15. The information processor according to claim 11, wherein the circuitry is configured to:
determine the relationship between the first and second tag information by machine learning, and
generate the same identification information for the first and second tag information.

16. An information processing method executed by an information processor, the method comprising:
determining a relationship between first tag information and second tag information;
associating a first captured image corresponding to the first tag information and a second captured image corresponding to the second tag information with a same first identification information based upon the relationship between the first tag information and the second tag information, the first captured image being different from the second captured image, the first tag information being different from the first identification information, the second tag information being different from the first identification information, and the first identification information being a unique identifier of the first tag information and the second tag information;

associating a third captured image corresponding to third tag information with second identification information, the third captured image being different from the first captured image and the second captured image, the third tag information being different from the second identification information, the second identification information being a unique identifier of the third tag information, and the second identification information being different from the first identification information; and reproducing at least one of the first captured image, the second captured image, and the third captured image on a basis of a set reproduction condition, wherein the first captured image, the second captured image, and the third captured image are all a part of a same content.

17. An information processing method executed by an information processor, the method comprising:
associating a first captured image captured by an imaging apparatus with first tag information;
associating a second captured image captured by the imaging apparatus with second tag information, the first captured image being different from the second captured image;
associating a third captured image captured by the imaging apparatus with third tag information, the third captured image being different from the first captured image and the second captured image;
determining a relationship between the first tag information and the second tag information;
associating the first captured image corresponding to the first tag information and the second captured image corresponding to the second tag information with a same first identification information based upon the relationship between the first tag information and the second tag information, the first tag information being different from the first identification information, the second tag information being different from the first identification information, and the first identification information being a unique identifier of the first tag information and the second tag information; and
associating the third captured image corresponding to the third tag information with second identification information, the third tag information being different from the second identification information, the second identification information being a unique identifier of the third tag information, and the second identification information being different from the first identification information, wherein the first captured image, the second captured image, and the third captured image are all a part of a same content.

* * * * *